US012810033B2

(12) United States Patent
Sloane et al.

(10) Patent No.: US 12,810,033 B2
(45) **Date of Patent: *Nov. 24, 2026**

(54) SYSTEM FOR ELECTRONIC DATA ARTIFACT TESTING USING A HYBRID CENTRALIZED-DECENTRALIZED COMPUTING PLATFORM

(71) Applicant: BANK OF AMERICA CORPORATION, Charlotte, NC (US)

(72) Inventors: Brandon Sloane, Indian Land, SC (US); Julio Cesar Nunez, Denver, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/987,805

(22) Filed: Dec. 19, 2024

(65) Prior Publication Data

US 2025/0117522 A1 Apr. 10, 2025

Related U.S. Application Data

(63) Continuation of application No. 17/470,729, filed on Sep. 9, 2021, now Pat. No. 12,175,006.

(51) Int. Cl.

| | |
|---|---|
| ***G06F 21/64*** | (2013.01) |
| ***G06F 9/54*** | (2006.01) |
| ***G06F 16/2457*** | (2019.01) |

(52) U.S. Cl.

CPC .............. *G06F 21/64* (2013.01); *G06F 9/547* (2013.01); *G06F 16/24578* (2019.01)

(58) Field of Classification Search

CPC ...................................................... G06F 21/64

See application file for complete search history.

(56) References Cited

U.S. PATENT DOCUMENTS

| | | | |
|---|---|---|---|
| 9,057,645 | B2 | 6/2015 | Holub |
| 9,332,022 | B1 | 5/2016 | Ashley |

(Continued)

OTHER PUBLICATIONS

D. P, M. Kumar S, C. Raghavendra, K. Prasad SJ, K. H and D. SS, "Cyber Security Threats Detection Analysis and Remediation," 2021 IEEE Mysore Sub Section International Conference (MysuruCon), Hassan, India, 2021, pp. 766-772. (Year: 2021).*

(Continued)

*Primary Examiner* — Kari L Schmidt

(74) *Attorney, Agent, or Firm* — Moore & Van Allen PLLC; Nicholas C. Russell

(57) ABSTRACT

A system is provided for electronic data artifact testing using a hybrid centralized-decentralized computing platform. In particular, the system may comprise an artifact testing platform that may be accessed by users and computing devices within a network. Users may upload a data artifact to the artifact testing platform to be validated by the system. The system may then use a number of different validators (e.g., artificial intelligence-based modules) that may read the data artifact and/or the associated metadata and generate a confidence level based on the characteristics of the data artifact. The confidence levels from each validator may be aggregated to generate a final trust score for the data artifact. If the final trust score is below a first threshold, blocking the user computing device from opening the electronic file and if the final trust score is below a second threshold, performing network segmentation of the user computing device.

20 Claims, 2 Drawing Sheets

(56) References Cited

U.S. PATENT DOCUMENTS

| | | | | |
|---|---|---|---|---|
| 9,336,060 | B2 | 5/2016 | Nori | |
| 9,455,979 | B2 | 9/2016 | Blanke | |
| 9,876,803 | B2 | 1/2018 | Miu | |
| 10,338,913 | B2 | 7/2019 | Franchitti | |
| 10,860,726 | B2 | 12/2020 | Dikhit | |
| 10,929,545 | B2 | 2/2021 | Castinado | |
| 10,979,452 | B2 | 4/2021 | Kundu | |
| 11,271,955 | B2 | 3/2022 | Vashisht | |
| 11,750,618 | B1 | 9/2023 | Vashisht | |
| 11,783,062 | B2 | 10/2023 | Lounsberry | |
| 2009/0290580 | A1 | 11/2009 | Wood | |
| 2012/0023480 | A1 | 1/2012 | Perlmutter | |
| 2014/0020047 | A1 | 1/2014 | Liebmann | |
| 2015/0220735 | A1 | 8/2015 | Paithane | |
| 2016/0048408 | A1 | 2/2016 | Madhu | |
| 2016/0248631 | A1 | 8/2016 | Duchesneau | |
| 2016/0335435 | A1* | 11/2016 | Schmidtler | G06F 21/565 |
| 2018/0091453 | A1 | 3/2018 | Jakobsson | |
| 2018/0095778 | A1 | 4/2018 | Aydelott | |
| 2018/0096175 | A1 | 4/2018 | Schmeling | |
| 2018/0337931 | A1 | 11/2018 | Hermoni | |
| 2018/0341701 | A1 | 11/2018 | Verma | |
| 2018/0359280 | A1 | 12/2018 | Elworthy | |
| 2019/0030617 | A1 | 1/2019 | Nishimiya | |
| 2019/0132709 | A1 | 5/2019 | Graefe | |
| 2019/0146949 | A1 | 5/2019 | Kothari | |
| 2019/0171872 | A1 | 6/2019 | Northrup | |
| 2019/0207966 | A1 | 7/2019 | Vashisht | |
| 2019/0207967 | A1 | 7/2019 | Vashisht | |
| 2019/0266325 | A1 | 8/2019 | Scherman | |
| 2019/0303579 | A1 | 10/2019 | Reddy | |
| 2019/0303623 | A1 | 10/2019 | Reddy | |
| 2019/0332921 | A1 | 10/2019 | Rodriguez | |
| 2020/0004904 | A1 | 1/2020 | Crabtree | |
| 2020/0007513 | A1 | 1/2020 | Gleichauf | |
| 2020/0052906 | A1 | 2/2020 | Cahill | |
| 2020/0162483 | A1 | 5/2020 | Farhady | |
| 2020/0177467 | A1* | 6/2020 | Ramachandran | H04L 43/04 |
| 2020/0202071 | A1 | 6/2020 | Ghulati | |
| 2020/0202480 | A1 | 6/2020 | Appu | |
| 2020/0274894 | A1 | 8/2020 | Argoeti | |
| 2020/0278922 | A1 | 9/2020 | Weiss | |
| 2020/0326932 | A1 | 10/2020 | Sharma | |
| 2020/0358798 | A1 | 11/2020 | Maylor | |
| 2020/0389469 | A1 | 12/2020 | Litichever | |
| 2021/0124760 | A1 | 4/2021 | Klein | |
| 2021/0377303 | A1 | 12/2021 | Bui | |
| 2022/0100858 | A1 | 3/2022 | Todd | |
| 2023/0004638 | A1* | 1/2023 | Singh | H04L 51/212 |
| 2023/0007042 | A1 | 1/2023 | Haworth | |
| 2023/0315734 | A1* | 10/2023 | Buchmann | G06F 16/211<br>707/769 |
| 2023/0370495 | A1 | 11/2023 | Desai | |

OTHER PUBLICATIONS

T. Kuhn and M. Dumontier, "Making Digital Artifacts on the Web Verifiable and Reliable," in IEEE Transactions on Knowledge and Data Engineering, vol. 27, No. 9, pp. 2390-2400, Sep. 1, 2015. (Year: 2015).*

Du, Xiaoyu, and Mark Scanlon. "Methodology for the automated metadata-based classification of incriminating digital forensic artefacts." Proceedings of the 14th International Conference on Availability, Reliability and Security. 2019, pp. 1-8. (Year: 2019).

L Caviglione et al., "Tight Arms Race: Overview of Current Malware Threats and Trends in Their Detection," in IEEE Access, vol. 9, pp. 5371-5396, 2021. (Year: 2021).

* cited by examiner

SYSTEM FOR ELECTRONIC DATA ARTIFACT TESTING USING A HYBRID CENTRALIZED-DECENTRALIZED COMPUTING PLATFORM

CROSS-REFERENCE TO RELATED APPLICATION

This application is a continuation application of and claims priority benefit to U.S. patent application Ser. No. 17/470,729 filed Sep. 9, 2021, and of the same title; the contents of which are also incorporated herein by reference.

FIELD OF THE INVENTION

The present disclosure embraces a system for electronic data artifact testing using a hybrid centralized-decentralized computing platform.

BACKGROUND

There is a need for an efficient and expedient way to perform testing of data artifacts.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for electronic data artifact testing using a hybrid centralized-decentralized computing platform. In particular, the system may comprise an artifact testing platform that may be accessed by users and computing devices within a network. Users may upload a data artifact to the artifact testing platform to be validated by the system. The system may then use a number of different validators (e.g., artificial intelligence-based modules) that may read the data artifact and/or the associated metadata and generate a confidence level based on the characteristics of the data artifact. The confidence levels from each validator may be aggregated to generate a final trust score for the data artifact. In this way, the system may provide a secure way to perform validation of data artifacts within a network environment.

Accordingly, embodiments of the present disclosure provide a system for electronic data artifact testing using a hybrid centralized-decentralized computing platform, the system comprising a memory device with computer-readable program code stored thereon; a communication device; and a processing device operatively coupled to the memory device and the communication device, wherein the processing device is configured to execute the computer-readable program code to receive, from a user computing device, a request to validate a data artifact, wherein the request comprises the data artifact and a query associated with the data artifact; identify one or more characteristics of the data artifact by analyzing the data artifact, the query, and metadata associated with the data artifact; based on the one or more characteristics of the data artifact, identify and select one or more validators to validate the data artifact; receive one or more confidence scores from each of the one or more validators, wherein each of the one or more confidence scores is a numerical value representing a trustworthiness of the data artifact; aggregate the one or more confidence scores to generate a final trust score; and present the final trust score to the user computing device.

In some embodiments, the computer-readable program code further causes the processing device to execute an automated remediation process on the data artifact, wherein the automated remediation process comprises detecting that the final trust score is below a first threshold; and executing a first process on the data artifact, wherein the first process comprises at least one of isolating or deleting the data artifact.

In some embodiments, aggregating the one or more confidence scores further comprises detecting that a first validator of the one or more validators is more likely to generate an accurate confidence score than a second validator of the one or more validators; and assigning a first weight value to a confidence score of the first validator and a second weight value to a confidence score of the second validator, wherein the first weight value is greater than the second weight value.

In some embodiments, detecting that the first validator is more likely to generate an accurate confidence score comprises detecting that the first validator has a higher level of historical accuracy for previously computed confidence scores.

In some embodiments, the computer-readable program code further causes the processing device to dynamically adjust, using an artificial intelligence based process, the first weight value based on historical data associated with the first validator and the second weight value based on historical data associated with the second validator.

In some embodiments, receiving the request to validate the data artifact comprises presenting a graphical user interface for an artifact testing platform; and receiving the data artifact as a file upload to a web server associated with the artifact testing platform.

In some embodiments, receiving the request to validate the data artifact comprises receiving the data artifact through a secure application programming interface ("API") based communication channel.

Embodiments of the present disclosure also provide a computer program product for electronic data artifact testing using a hybrid centralized-decentralized computing platform, the computer program product comprising at least one non-transitory computer readable medium having computer-readable program code portions embodied therein, the computer-readable program code portions comprising executable portions for receiving, from a user computing device, a request to validate a data artifact, wherein the request comprises the data artifact and a query associated with the data artifact; identifying one or more characteristics of the data artifact by analyzing the data artifact, the query, and metadata associated with the data artifact; based on the one or more characteristics of the data artifact, identifying and selecting one or more validators to validate the data artifact; receiving one or more confidence scores from each of the one or more validators, wherein each of the one or more confidence scores is a numerical value representing a trustworthiness of the data artifact; aggregating the one or more confidence scores to generate a final trust score; and presenting the final trust score to the user computing device.

In some embodiments, the computer-readable program code portions further comprise executable portions for executing an automated remediation process on the data artifact, wherein the automated remediation process comprises detecting that the final trust score is below a first threshold; and executing a first process on the data artifact, wherein the first process comprises at least one of isolating or deleting the data artifact.

In some embodiments, aggregating the one or more confidence scores further comprises detecting that a first validator of the one or more validators is more likely to generate an accurate confidence score than a second validator of the one or more validators; and assigning a first weight value to a confidence score of the first validator and a second weight value to a confidence score of the second validator, wherein the first weight value is greater than the second weight value.

In some embodiments, detecting that the first validator is more likely to generate an accurate confidence score comprises detecting that the first validator has a higher level of historical accuracy for previously computed confidence scores.

In some embodiments, the computer-readable program code portions further comprise executable portions for dynamically adjusting, using an artificial intelligence based process, the first weight value based on historical data associated with the first validator and the second weight value based on historical data associated with the second validator.

In some embodiments, receiving the request to validate the data artifact comprises presenting a graphical user interface for an artifact testing platform; and receiving the data artifact as a file upload to a web server associated with the artifact testing platform.

Embodiments of the present disclosure also provide a computer-implemented method for electronic data artifact testing using a hybrid centralized-decentralized computing platform, the computer-implemented method comprising receiving, from a user computing device, a request to validate a data artifact, wherein the request comprises the data artifact and a query associated with the data artifact; identifying one or more characteristics of the data artifact by analyzing the data artifact, the query, and metadata associated with the data artifact; based on the one or more characteristics of the data artifact, identifying and selecting one or more validators to validate the data artifact; receiving one or more confidence scores from each of the one or more validators, wherein each of the one or more confidence scores is a numerical value representing a trustworthiness of the data artifact; aggregating the one or more confidence scores to generate a final trust score; and presenting the final trust score to the user computing device.

In some embodiments, the computer-implemented method further comprises executing an automated remediation process on the data artifact, wherein the automated remediation process comprises detecting that the final trust score is below a first threshold; and executing a first process on the data artifact, wherein the first process comprises at least one of isolating or deleting the data artifact.

In some embodiments, aggregating the one or more confidence scores further comprises detecting that a first validator of the one or more validators is more likely to generate an accurate confidence score than a second validator of the one or more validators; and assigning a first weight value to a confidence score of the first validator and a second weight value to a confidence score of the second validator, wherein the first weight value is greater than the second weight value.

In some embodiments, detecting that the first validator is more likely to generate an accurate confidence score comprises detecting that the first validator has a higher level of historical accuracy for previously computed confidence scores.

In some embodiments, the computer-implemented method further comprises dynamically adjusting, using an artificial intelligence based process, the first weight value based on historical data associated with the first validator and the second weight value based on historical data associated with the second validator.

In some embodiments, receiving the request to validate the data artifact comprises presenting a graphical user interface for an artifact testing platform; and receiving the data artifact as a file upload to a web server associated with the artifact testing platform.

In some embodiments, receiving the request to validate the data artifact comprises receiving the data artifact through a secure application programming interface ("API") based communication channel.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
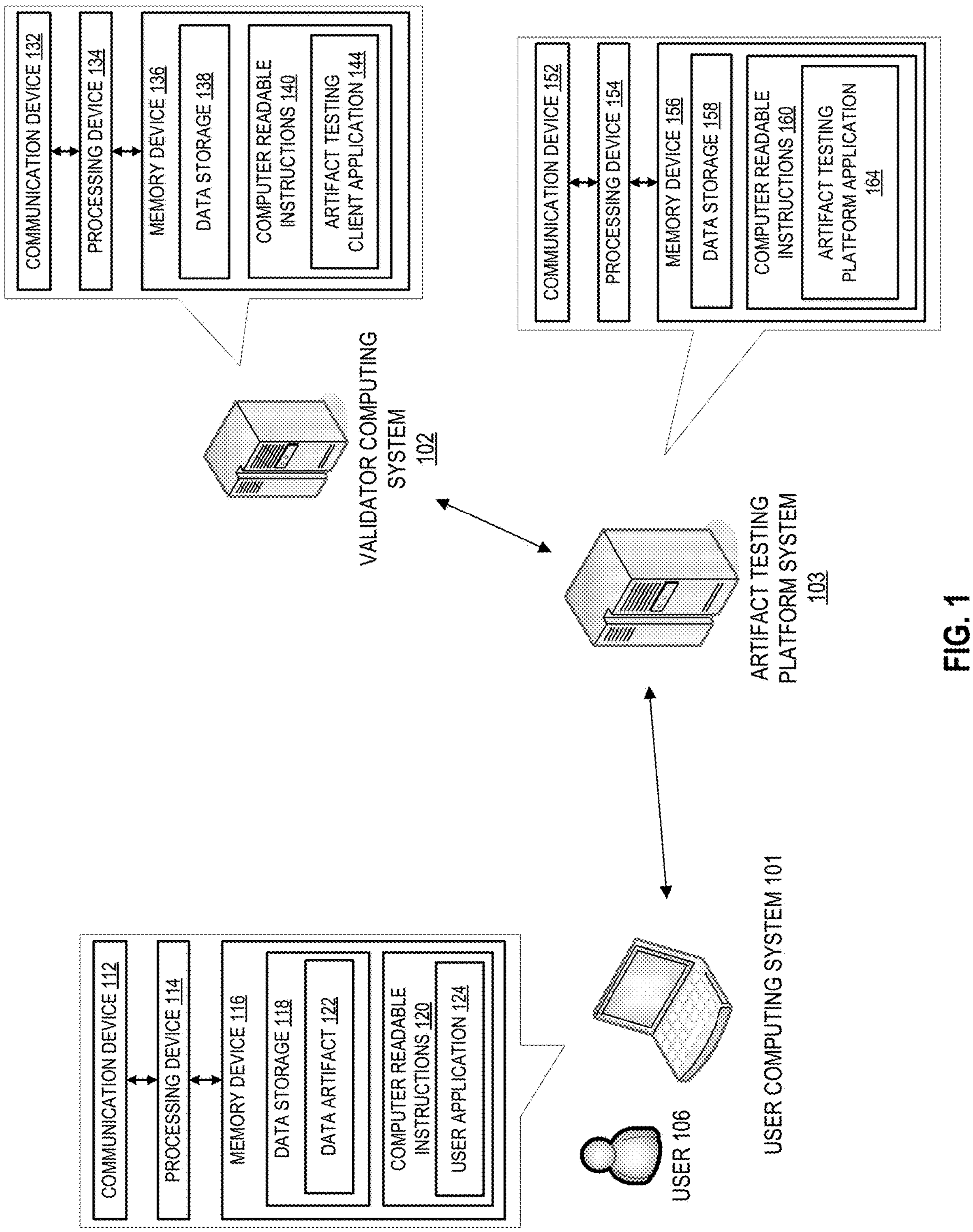
Figure 2:
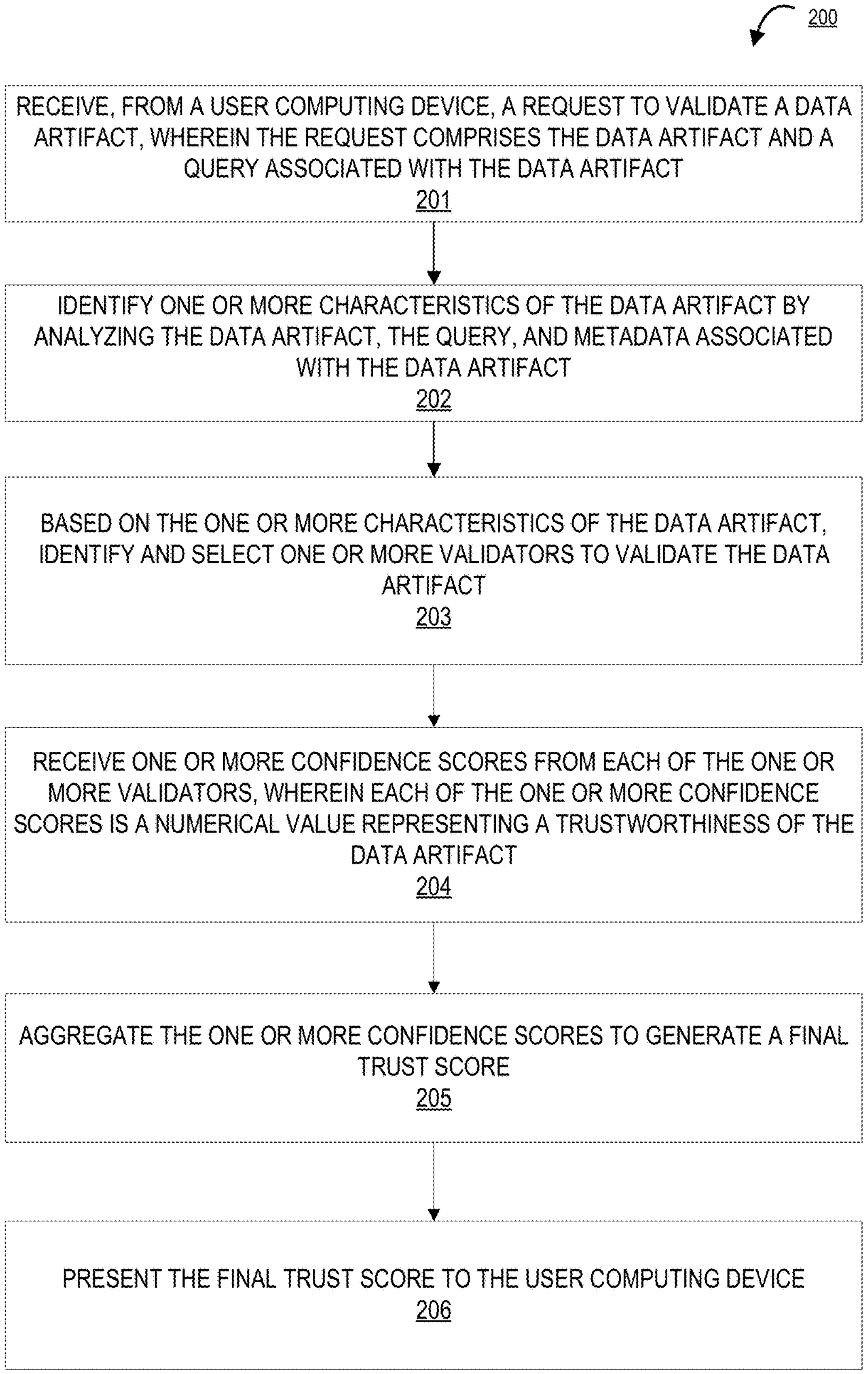

Having thus described embodiments of the invention in general terms, reference will now be made to the accompanying drawings, wherein:

FIG. 1 illustrates an operating environment for the artifact testing platform system, in accordance with one embodiment of the present disclosure;

FIG. 2 is a flow diagram illustrating a process for validating data artifacts through an artifact testing platform, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein.

Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to tangible or intangible objects which may be held, owned, or used by a user and/or the entity. In this regard, examples of such resources may include electronic data files, documents, computing devices and/or other types of electronic hardware, funds, financial instruments, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

"Data artifact" as used herein may refer to data that may contain certain types of information to be evaluated for validity or trustworthiness. For instance, data artifacts may include data files (e.g., executables), documents, messages, e-mails, character strings or sentences (e.g., statements of fact), or the like.

Users within a network environment may encounter various types of data artifacts for which the validity or trustworthiness of such artifacts may be difficult to assess. For instance, a user may have issues determining whether a particular e-mail is legitimate (e.g., is sent by a trusted party, contains trusted information and/or attachments, or the like), which in turn may delay or prevent the user from taking appropriate actions with respect to the artifact (e.g., opening the e-mail and/or its attachments, deleting and/or quarantining the e-mail, submitting the e-mail to a data security team, or the like). In other instances, the user may encounter a data file (e.g., an executable) from an unknown origin, where the user is unsure as to whether the data file is safe to open or execute.

To address the scenarios described above among others, the system as described herein provides an artifact testing platform that provides a way to validate the trustworthiness of data artifacts. To this end, the platform may receive data artifacts from users as inputs, where the data artifact may be accompanied by artifact metadata (e.g., file type, file history, creation/modification date, file description, or the like) and/or information about the data artifact provided by the user (e.g., a prompt or query regarding the data artifact). The system may read the data artifact along with the artifact metadata to identify one or more characteristics or properties of the data artifact. For instance, by reading the metadata and/or description of an e-mail submitted by the user, the system may determine that the e-mail was sent from a particular domain and pertains to a security update to be applied to the user's computing system.

In some embodiments, at least a portion of the functions of the artifact testing platform may be integrated into the interfaces of existing applications and/or software within the user's computing system. For instance, the artifact testing platform may integrate certain functions into the shell of the user computing system's operating system and/or applications (e.g., e-mail client, file explorer, or the like) such that users may directly submit data artifacts to the artifact testing platform with minimal disruptions to workflow. In an exemplary embodiment, the user may identify a suspicious file stored within the memory of the user computing system. Within the file explorer, the user may open a context menu (e.g., by right-clicking the suspicious file using a mouse device) and select an option to securely transmit the suspicious file for analysis by the artifact testing platform.

Based on the detected characteristics of the data artifact, the artifact testing platform may call upon one or more validators (e.g., users, computing systems, applications, databases or repositories, intelligence feeds, AI modules, or the like) to validate the data artifact based on the characteristics. In this regard, the validators may be selected based on the suitability of a particular validator to evaluate the data artifact along its one or more characteristics. For instance, if the e-mail was sent from a particular domain, the platform may call upon a validator that may have knowledge about trusted domains for e-mails (e.g., a repository of trusted domain names). Furthermore, based on the contents of the e-mail (e.g., that the e-mail pertains to a security update), the system may call upon a validator that has knowledge about approved security updates (e.g., a database of authorized security updates, a systems administrator, or the like). In some embodiments, the type of validators called by the system may be dependent on the data type of the data artifact being submitted. For instance, if the data artifact is an executable file, the system may call an antivirus scanning application (e.g., through an API-based interaction) as a validator of the data artifact.

Each of the validators may generate a confidence score associated with the data artifact, where the confidence score may be a numerical value that reflects the trustworthiness of the data artifact or a degree of confidence in the trustworthiness of the data artifact as assessed by a particular validator (e.g., a number ranging from 0 to 100). For instance, a query that accompanies a data artifact may be "is this executable safe to run?" In such a scenario, a confidence score of 0.8 for a particular validator may indicate that the validator is 80% confident that the executable is safe to run. Once the confidence scores have been generated, the system may aggregate the confidence scores from each validator to generate a final trust score. In some embodiments, the confidence scores for validators may be weighted relative to one another such that the inputs of certain validators may have a greater impact on the final trust score than the inputs of other validators. The weighting of confidence scores may be based at least in part on the characteristics of the validator (e.g., historical accuracy of confidence levels, characteristics or qualifications, skills, or the like) and/or other factors, such as the types of data artifacts, prioritization, specific timeframes, or the like. For example, if the data artifact is a statement of fact regarding a particular programming language (e.g., C++), validators that have knowledge regarding C++ may be given greater weight than validators without such knowledge. Once the trust score is generated, the trust score may be transmitted to the user.

In some embodiments, the one or more validators may comprise automated AI-based systems that may evaluate data artifacts based on historical analysis requests and/or data artifacts. Based on the resolution of query and/or data artifact submitted by the user, the system may determine the degree of accuracy of the confidence scores and/or trust scores generated by the system. For instance, the system may determine that the system previously generated a trust score of 90% for a particular executable file. However, the system may determine that the executable file was subsequently found to include malware. With this information, the system may train the artificial intelligence/machine learning components of the platform based on this historical information.

The system may further comprise an automated remediation engine that may execute one or more processes to remediate certain findings with respect to the data artifact. For instance, the system may determine that there is a 90% chance that a particular e-mail contains a link that may compromise any systems that are used to access the link. Based on detecting that said chance exceeds a certain threshold (e.g., 85%), the system may automatically execute one or more processes to mitigate the potential damage that could be caused by the e-mail (e.g., automatically disabling and/or redacting the link, running malware scans, deleting the e-mail, performing network segmentation of affected computing systems, or the like).

An exemplary use case of the system as described herein is provided below. It should be understood that said use case is provided for illustrative purposes only and is not intended to reduce or limit the scope of the disclosure. In one embodiment, a user may receive an e-mail that appears to be of unknown trustworthiness to the user (e.g., the e-mail appears to be from a trusted contact but contains an unusual message, such as a request to open the attachment embedded in the e-mail). In such a scenario, the user may wish to verify the validity of the e-mail in terms of its sender and/or the contents of the e-mail. To this end, the user may designate the e-mail as a data artifact to be analyzed by the system (e.g., by interacting with a UI element such as a button or context menu option in the user's e-mail client), which then causes the data artifact (e.g., the e-mail) to be transmitted to the artifact testing platform for evaluation. The user may further submit a query regarding the data artifact, which in some embodiments may be a text string posing a question about the data artifact (e.g., "Is this e-mail safe to open?").

The system may then analyze the data artifact, the metadata associated with the data artifact, and the query associated with the data artifact to identify and categorize one or more characteristics of the data artifact. For instance, the system may read the metadata (e.g., sender information, timestamp, domains, and the like) to determine that the e-mail was sent from an external domain. Furthermore, the system may determine that the e-mail contains a document attachment containing executable code that is configured to be executed upon the opening of the e-mail attachment by the user. Based on the identified characteristics of the data artifact, the system may allocate one or more validators as resources to assess the identified characteristics of the data artifact. For instance, in response to the system determining that the e-mail was sent from an external domain, the system may access a database of known domain names and/or senders to determine whether the domain from which the e-mail was sent is trusted or blocked (e.g., has been found by the entity to contain unauthorized or malicious code in the past). Upon determining that the e-mail attachment contains executable code, the system may (e.g., via an API call) call one or more applications (e.g., antivirus applications) to perform automated and/or heuristic scanning of the e-mail attachment. In some embodiments, the system may submit requests for responses from certain personnel who may have the expertise to evaluate the attachment (e.g., an anti-malware specialization team). Further, the system may call on AI-powered modules to analyze the content of the e-mail attachment for similarities to previously submitted e-mails that may have contained unauthorized or malicious content (e.g., malware).

One or more of the validators may generate a confidence score which indicates the individual validator's level of confidence in the validity of the data artifact. In this regard, the confidence scores may depend on the initial query submitted by the user. Continuing the example, the user may wish to know whether the e-mail (including any attachments) is safe to open. Accordingly, each of the validators may generate a confidence score that reflects the degree to which each validator is confident that the e-mail is safe to open. For instance, a first validator (e.g., the database of trusted domains and/or senders) may detect that the e-mail was sent from a trusted domain and/or sender, and thereafter generate a confidence score of 70. That said, a second validator (e.g., the antivirus application) may detect that the e-mail attachment contains suspicious executable code, and thereafter generate a confidence score of 20. Furthermore, a third validator (e.g., the anti-malware team) may determine that the e-mail appears (e.g., in terms of language and/or content), and thereafter generate a confidence score of 10. Finally, a fourth validator (e.g., the AI-powered module) may determine that the e-mail has similar features to historical e-mails that were found to contain malware, and thereafter generate a confidence score of 10.

The system may assign different weights to the various confidence scores depending on the nature of the data artifact and/or the metadata, the characteristics and/or qualities of the validators, or the like. For instance, an e-mail may be unsafe to open even if it is sent from a trusted domain or sender, which will cause the system to assign a relatively lower weight value to the confidence score generated by the first validator. By contrast, detecting that there is suspicious executable code within the e-mail's attachment is a strong indicator that the e-mail is unsafe to open, which will cause the system to assign a relatively higher weight value to the confidence score generated by the second validator. After assigning weights to each of the confidence scores, the system may generate a final trust score based on the individual confidence scores (e.g., by using a weighted average computation). For instance, the final trust score may be a score of 12. The trust score may then be provided to the user (e.g., by displaying the trust score on the user computing system). In some embodiments, the system may further generate a log of generated trust scores, where the log may include information about how the scores were calculated (e.g., the validators selected, the individual confidence scores, the weight values assigned, and the like) along with an explanation of factors in generating the trust score. In this way, the user may receive a quantifiable metric that allows the user to quickly assess the trustworthiness of a particular data artifact.

In some embodiments, the automated remediation engine may execute one or more processes on the data artifact based on the trust score. For instance, in response to detecting that the trust score is below a certain threshold (e.g., 20), the remediation engine may take various actions on the e-mail, including quarantining the e-mail attachment, blocking the opening of attachments and/or executables on the target computing system (e.g., the user computing system), deleting the e-mail, executing anti-malware scans on potentially affected computing systems, performing network segmentation on potentially affected computing systems, and/or the like.

The system as described herein confers a number of technological advantages over conventional artifact testing systems. For instance, by providing the artifact testing platform, the system allows users to analyze and assess data artifacts that may not be adequately validated using conventional data scanning or heuristic methods without being reliant on a single source of truth. Furthermore, the integration of the platform's features with the UI of the user computing system allows the user to seamlessly submit data artifacts for testing with minimal disruption in workflows.

Turning now to the figures, FIG. 1 illustrates an operating environment 100 for the data artifact testing system, in accordance with one embodiment of the present disclosure. In particular, FIG. 1 illustrates an artifact testing platform system 103 in operative communication with a user computing system 101 and validator computing system 102 over a network. In such a configuration, the artifact testing platform system 103 may transmit data to and receive data from computing systems over the network, including the user computing system 101 and/or the validator computing system 102.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts a single validator computing system 102, the operating environment may comprise multiple validator computing systems that may validate data artifacts as identified and/or selected by the user computing system 101 and/or the artifact testing platform system 103. It should also be appreciated that one or more functions of the systems, devices, or servers as depicted in FIG. 1 may be combined into a single system, device, or server and/or performed by other computing systems. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the artifact testing platform system 103 may be a computing system that hosts the artifact testing platform and coordinates the selection of validators based on data artifacts received from various sources (e.g., the user computing system 101). Accordingly, the artifact testing platform system 103 may comprise a processing device 154 operatively coupled to a communication device 152 and a memory device 156. The memory device 156 may comprise data storage 158 and computer readable instructions 160 stored thereon, where the computer readable instructions 160 may comprise an artifact testing platform application 164. The artifact testing platform application 164 may, when executed by the processor 154 of the artifact testing platform system 103, cause the processor 154 to perform the data artifact identification, assessment, and/or validation functions of the artifact testing platform system 103.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the user computing system 101 may be in operative communication with the validator computing system 102 and/or the artifact testing platform system 103. The user computing system 101 may be a computing system owned and/or operated by a user 106, where the user may be an individual who is associated with the entity (e.g., an authorized user on the entity's network). In particular, the user 106 may use the user computing system 101 to access the platform hosted by the artifact testing platform system 103. Accordingly, the user computing system 101 may comprise a communication device 112, a processing device 114, and a memory device 116. In some embodiments, the user computing system 101 may comprise hardware and/or software components that allow the user computing system 101 to interface with the user 106. In such embodiments, the user computing system 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing system 101 may further comprise data storage 118 and computer-readable instructions 120 stored thercon. The data storage 118 may have a data artifact 122 stored thereon, where the data artifact 122 may be an artifact that the user 106 has selected for validation and/or evaluation. The computer-readable instructions 120 may comprise a user application 124. The user application 124 may be a software application that the user 106 may use to access the artifact testing platform and the functions provided therein. In this regard, the user application 124 may in some embodiments be a web application or a browser that may access a web-based artifact testing platform hosted by the artifact testing platform system 103. In other embodiments, the user application 124 may be an application with integrated functions for interacting with the artifact testing platform system 103, such as an e-mail client capable of transmitting the data artifact 122 directly to the artifact testing platform system 103.

As further illustrated in FIG. 1, the validator computing system 102 may be a computing system that may be used by a validator of the data artifact 122 or may itself be a validator of the data artifact 122. Accordingly, the validator computing system 102 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138, where the computer-readable instructions 140 may have an artifact testing client application 144 stored thereon. The artifact testing client application 144 may cause the processing device 134 to interact with the artifact testing platform system 103 and to execute any number of validation processes on the data artifact 122, including generating confidence scores associated with the data artifact 122.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

FIG. 2 is a flow diagram illustrating a process flow 200 for validating data artifacts through an artifact testing platform, in accordance with one embodiment of the present disclosure. The process begins at block 201, where the system receives, from a user computing device, a request to validate a data artifact, wherein the request comprises the data artifact and a query associated with the data artifact. The data artifact may be a piece of data that a user wishes to evaluate for trustworthiness. For instance, the data artifact may be an executable file of unknown trustworthiness such that the user does not know whether the file is safe to open. Accordingly, the user may submit the data artifact along with a query (e.g., "Is this file safe to open?") to the artifact testing platform for evaluation. In some embodiments, the user may access a user interface for the artifact testing platform that may take the form of a webpage hosted by the system. In such embodiments, the system may present a graphical user interface of the artifact testing platform to the user, where the interface may include various UI elements for interacting with the artifact testing platform. For instance, the user may select and upload the data artifact, enter queries and/or supplementary information about the data artifact through the various UI elements of the graphical interface. In other embodiments, the functions of the artifact testing platform may be integrated within certain user applications on the user computing system. For example, a file browsing program on the user computing system may contain integrated functions that allow the user to quickly identify data artifacts to be evaluated (e.g., by selecting the "upload to artifact testing platform" option within a context menu of the file browser program). In such embodiments, the system may receive the data artifact, metadata, and/or query through a secure API connection to an integrated application on the user computing system.

The process continues to block 202, where the system identifies one or more characteristics of the data artifact by analyzing the data artifact, the query, and metadata associated with the data artifact. For instance, the system may identify characteristics of the data artifact, such as the data type, file name, file extension, file creation date, associated applications, and the like. Furthermore, the query and/or metadata may include information regarding the circumstances in which the data artifact was encountered (e.g., the user may indicate that the data artifact was received in an e-mail as an attachment).

The process continues to block 203, where the system, based on the one or more characteristics of the data artifact, identifies, and selects one or more validators to validate the data artifact. In this regard, the system may select its validators that may be best suited to evaluate the trustworthiness of the data artifact depending on its characteristics. For instance, if the data artifact is an executable file, the system may call anti-malware applications as validators to assess the data artifact. Furthermore, if the data artifact was sent as an e-mail attachment, the system may call upon an anti-malware specialist team that has specialized experience dealing with such vectors. Accordingly, it should be understood that "validators" may include users, systems, applications, or the like.

The process continues to block 204, where the system receives one or more confidence scores from each of the one or more validators, wherein each of the one or more confidence scores is a numerical value representing a trustworthiness of the data artifact. Each validator called by the system may submit a confidence score that reflects the individual level of confidence that the validator has in the trustworthiness of the data artifact. In one embodiment, confidence scores may be numerical values that fall within a predetermined range (e.g., 0 to 100), where lower values indicate a lower level of confidence, while higher values indicate a higher level of confidence. In some embodiments, the confidence score may further reflect a magnitude of possible adverse effects that the data artifact may impose on the system from a security or systems integrity standpoint. For instance, a data artifact that contains aggressive malware that may result in significant data loss may be associated with a lower confidence score than a data artifact that will not result in data loss.

The process continues to block 205, wherein the system aggregates the one or more confidence scores to generate a final trust score. In this regard, the system may take an average of the confidence scores submitted by each validator in calculating the final trust score. In some embodiments, the system may assign different weightings to certain validators such that the final trust score is computed as a weighted average of confidence scores. For instance, the system may detect that a first validator of the one or more validators is more likely to generate an accurate confidence score than a second validator of the one or more validators. In such an embodiment, the system may assign a relatively greater weighting to a confidence score of the first validator and a relatively lower weighting to a confidence score of the second validator.

The process concludes at block 206, where the system presents the final trust score to the user computing device. For example, in one embodiment, the system may present the final trust score on a web page hosted on the artifact testing platform such that a user may view the final trust score from a web browser. In other embodiments, the final trust score may be transmitted to the user by other communication channels (e.g., e-mail, direct message, pop-up notification, or the like). In some embodiments, the system may further be configured to display a log of each final trust score that is computed as part of the artifact testing process. In such embodiments, the log may contain information such as the validators selected for validation, individual confidence scores, weight values for each validator, the final trust score, and the like.

In some embodiments, the system may use an automated remediation engine to automatically take certain actions on the data artifact depending on the final trust score generated from the artifact testing process. The actions or processes executed on the data artifact may depend on various thresholds for the final trust score. For example, if the final trust score falls below a first threshold (e.g., 40), the system may execute a first process on the data artifact (e.g., escalation, isolation, and/or quarantine of the data artifact), whereas if the final trust score falls below a second threshold (e.g., 20), the system may execute a second process on the data artifact (e.g., automatic deletion of the data artifact). In this way, the system may not only efficiently allocate resources to identifying and validating data artifacts, but it may also ensure the prompt resolution of potential issues with the data artifacts.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for electronic data artifact testing using a hybrid centralized-decentralized computing platform, the system comprising:
- a memory device comprising a non-transitory computer-readable medium with computer-readable program code stored thereon;
- a communication device; and
- a processing device operatively coupled to the memory device and the communication device, wherein the processing device is configured to execute the computer-readable program code to:
  - receive, from a user computing device, a request to validate a data artifact, wherein the request comprises the data artifact and a query associated with the data artifact, wherein the data artifact is an electronic file, wherein the query relates to whether the electronic file is safe to open;
  - identify one or more characteristics of the data artifact by analyzing the data artifact, the query, and metadata associated with the data artifact;
  - based on the one or more characteristics of the data artifact, identify and select one or more validators to validate the data artifact;
  - receive one or more confidence scores from each of the one or more validators, wherein each of the one or more confidence scores is a numerical value representing a trustworthiness of the data artifact;
  - aggregate the one or more confidence scores to generate a final trust score;
  - present the final trust score to the user computing device; and
  - initiate an automated remediation engine, wherein initiating the automated remediation engine comprises:
    - based on detecting that the final trust score is below a first threshold, blocking the user computing device from opening the electronic file; and
    - based on detecting that the final trust score is below a second threshold that is lower than the first threshold, performing network segmentation of the user computing device.

2. The system according to claim 1, wherein the one or more validators comprises one or more of:
- at least one anti-malware application; and/or
- an artificial intelligence module that analyzes the data artifact for similarities to previously submitted data artifacts containing malware.

3. The system according to claim 1, wherein aggregating the one or more confidence scores further comprises:
- detecting that a first validator of the one or more validators is more likely to generate an accurate confidence score than a second validator of the one or more validators; and
- assigning a first weight value to a confidence score of the first validator and a second weight value to a confidence score of the second validator, wherein the first weight value is greater than the second weight value.

4. The system according to claim 3, wherein detecting that the first validator is more likely to generate an accurate confidence score comprises detecting that the first validator has a higher level of historical accuracy for previously computed confidence scores.

5. The system according to claim 3, wherein the computer-readable program code further causes the processing device to dynamically adjust, using an artificial intelligence based process, the first weight value based on historical data associated with the first validator and the second weight value based on historical data associated with the second validator.

6. The system according to claim 1, wherein receiving the request to validate the data artifact comprises:
- presenting a graphical user interface for an artifact testing platform; and
- receiving the data artifact as a file upload to a web server associated with the artifact testing platform.

7. The system according to claim 1, wherein receiving the request to validate the data artifact comprises receiving the data artifact through a secure application programming interface based communication channel.

8. A computer program product for electronic data artifact testing using a hybrid centralized-decentralized computing platform, the computer program product comprising at least one non-transitory computer readable medium having computer-readable program code portions embodied therein, the computer-readable program code portions comprising executable portions for:
- receiving, from a user computing device, a request to validate a data artifact, wherein the request comprises the data artifact and a query associated with the data artifact, wherein the data artifact is an electronic file, wherein the query relates to whether the electronic file is safe to open;

identifying one or more characteristics of the data artifact by analyzing the data artifact, the query, and metadata associated with the data artifact;

based on the one or more characteristics of the data artifact, identifying and selecting one or more validators to validate the data artifact;

receiving one or more confidence scores from each of the one or more validators, wherein each of the one or more confidence scores is a numerical value representing a trustworthiness of the data artifact;

aggregating the one or more confidence scores to generate a final trust score;

presenting the final trust score to the user computing device; and initiating an automated remediation engine, wherein initiating the automated remediation engine comprises:

based on detecting that the final trust score is below a first threshold, blocking the user computing device from opening the electronic file; and based on detecting that the final trust score is below a second threshold that is lower than the first threshold, performing network segmentation of the user computing device.

9. The computer program product of claim 8, wherein the one or more validators comprises one or more of:

at least one anti-malware application; and/or an artificial intelligence module that analyzes the data artifact for similarities to previously submitted data artifacts containing malware.

10. The computer program product of claim 8, wherein aggregating the one or more confidence scores further comprises:

detecting that a first validator of the one or more validators is more likely to generate an accurate confidence score than a second validator of the one or more validators; and assigning a first weight value to a confidence score of the first validator and a second weight value to a confidence score of the second validator, wherein the first weight value is greater than the second weight value.

11. The computer program product of claim 10, wherein detecting that the first validator is more likely to generate an accurate confidence score comprises detecting that the first validator has a higher level of historical accuracy for previously computed confidence scores.

12. The computer program product of claim 10, wherein the computer-readable program code portions further comprise executable portions for dynamically adjusting, using an artificial intelligence based process, the first weight value based on historical data associated with the first validator and the second weight value based on historical data associated with the second validator.

13. The computer program product of claim 8, wherein receiving the request to validate the data artifact comprises:

presenting a graphical user interface for an artifact testing platform; and receiving the data artifact as a file upload to a web server associated with the artifact testing platform.

14. A computer-implemented method for electronic data artifact testing using a hybrid centralized-decentralized computing platform, the computer-implemented method comprising:

receiving, from a user computing device, a request to validate a data artifact, wherein the request comprises the data artifact and a query associated with the data artifact, wherein the data artifact is an electronic file, wherein the query relates to whether the electronic file is safe to open;

identifying one or more characteristics of the data artifact by analyzing the data artifact, the query, and metadata associated with the data artifact;

based on the one or more characteristics of the data artifact, identifying and selecting one or more validators to validate the data artifact;

receiving one or more confidence scores from each of the one or more validators, wherein each of the one or more confidence scores is a numerical value representing a trustworthiness of the data artifact;

aggregating the one or more confidence scores to generate a final trust score;

presenting the final trust score to the user computing device; and initiating an automated remediation engine, wherein initiating the automated remediation engine comprises:

based on detecting that the final trust score is below a first threshold, blocking the user computing device from opening the electronic file; and based on detecting that the final trust score is below a second threshold that is lower than the first threshold, performing network segmentation of the user computing device.

15. The computer-implemented method of claim 14, wherein the one or more validators comprises one or more of:

at least one anti-malware application; and/or an artificial intelligence module that analyzes the data artifact for similarities to previously submitted data artifacts containing malware.

16. The computer-implemented method of claim 14, wherein aggregating the one or more confidence scores further comprises:

detecting that a first validator of the one or more validators is more likely to generate an accurate confidence score than a second validator of the one or more validators; and assigning a first weight value to a confidence score of the first validator and a second weight value to a confidence score of the second validator, wherein the first weight value is greater than the second weight value.

17. The computer-implemented method of claim 16, wherein detecting that the first validator is more likely to generate an accurate confidence score comprises detecting that the first validator has a higher level of historical accuracy for previously computed confidence scores.

18. The computer-implemented method of claim 16, wherein the computer-implemented method further comprises dynamically adjusting, using an artificial intelligence based process, the first weight value based on historical data associated with the first validator and the second weight value based on historical data associated with the second validator.

19. The computer-implemented method of claim 14, wherein receiving the request to validate the data artifact comprises:

presenting a graphical user interface for an artifact testing platform; and receiving the data artifact as a file upload to a web server associated with the artifact testing platform.

20. The computer-implemented method of claim 14, wherein receiving the request to validate the data artifact comprises receiving the data artifact through a secure application programming interface based communication channel.

* * * * *